3,342,722
PETROLATUM PRODUCT CONTAINING A UNIFORMLY DISPERSED GAS

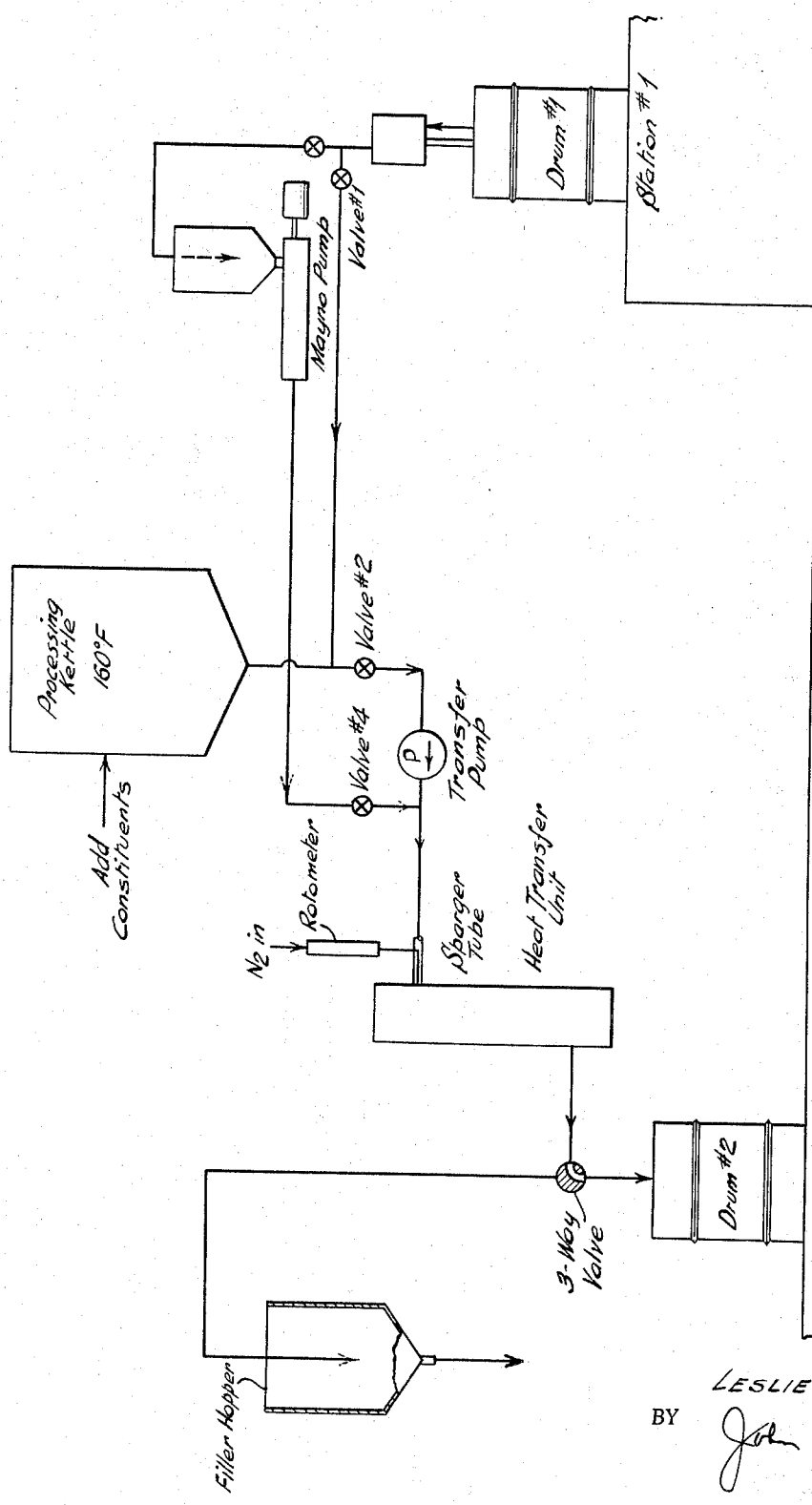

Leslie Jakab, New Brunswick, N.J., assignor to Johnson & Johnson, a corporation of New Jersey
Filed June 2, 1965, Ser. No. 460,626
1 Claim. (Cl. 208—20)

This invention relates to petrolatum and more particularly to petrolatum having improved physical and aesthetic characteristics, and to improvements in packaging petrolatum.

Petrolatum, also known as petroleum jelly, although commonly used, is of a complex nature. It consists generally of an unresolved mixture of solid and liquid hydrocarbons, chiefly of the methane series. It is a semi-solid, unctuous material of salve-like consistency ranging in color from yellowish to light amber to white. It is available in various grades having different densities and melting points. Generally, petrolatums which have a high melting point, e.g., 140° F., contain a greater amount of high melting fractions than those which have a lower melting point. The petrolatums having a low melting point are also somewhat "softer" and have a different texture. In its more purified forms, petrolatum is essentially odorless and tasteless and has numerous pharmaceutical and cosmetic applications.

Because it is a semi-solid, unctuous material, to package petrolatum in containers, such as glass jars, the petrolatum is heated to an extent whereby it may be poured into the container. It is then cooled. However, upon heating, petrolatum expands and upon cooling it shrinks to its original volume. In so doing, it pulls away from the walls of the container to form large, visible voids. Crater-like depressions are also formed in the top surface of the petrolatum, creating the impression that the container has not been filled. In addition, during filling, bubbles of air of various sizes become entrapped in the petrolatum, particularly between the inner surfaces of the walls of the container and the petrolatum. These effects are emphasized when the petrolatum is cooled rapidly after filling the container. The end result is an unattractive, unappealing package.

The foregoing problems are less pronounced when packaging petrolatums which have low melting points and which are softer. Conversely, the problems become more pronounced when packaging petrolatums having high melting points.

Attempts to resolve the problem led to the surprising discovery that instead of trying to eliminate air as completely as possible, the problem could be resolved by following an opposite course; that is, by uniformly dispersing a gas in the petrolatum while it is in a semi-congealed state to displace at least about one-half percent by weight of the petrolatum. This led to a further unexpected result in that the petrolatum had characteristics heretofore unavailable. It was found that by uniformly dispersing a gas throughout the petrolatum, an improvement in gloss, smoothness, consistency and texture is realized which makes it eminently suitable and desirable, particularly for cosmetic purposes. The petrolatum has a less greasy, oily feel and is also whiter.

Referring to the flow chart illustrated in the drawing, there is disclosed schematically for illustrative purposes, a batch process for preparing a petrolatum in accordance with the invention which is especially useful for cosmetic purposes. A 55 gallon drum, designated Drum No. 1, containing 400 lbs. of a highly purified, essentially odorless grade of white petrolatum (such as that available from Sonneborn Chemical and Refining Corporation under the trade name "White Perfecta"), which is of medium consistency and which has a density of about 0.886 at 25° C., a congealing point of about 85° F., and a melting point of about 145° F., is placed at Station 1. A pump of the type used to transfer greases, such as a Graco 1.5 ratio grease pump, i.e., the output pressure is five times the input pressure, available from Gray Company, Inc., of Minneapolis, Minn., having a downwardly movable disc which covers the top surface of the petrolatum is attached to the drum. With valve 1 open and valves 2 and 3 closed, the petrolatum is transferred through a line by the pump into a processing kettle wherein it is heated to 160° F., i.e., above its melting point. A perfume, a stabilizer, or other desired constituent may be incorporated at this stage and mixed with the petrolatum by a propeller type agitator. Valves 1 and 4 are then closed and valve 2 opened and the heated petrolatum containing the constituent is pumped by a suitable transfer pump, such as that available from the Waukesha Foundry Company, Waukesha, Wis., Model No. 25DO, from the processing kettle into a scraped surface, heat transfer unit, such as a Cherry-Burrell "Thermutator," available from Cherry-Burrell Corporation of Cedar Rapids, Iowa. The petrolatum is cooled in the heat transfer unit to 90° F. and the scraping blades in the unit are operated at 600 r.p.m. As the cooled petrolatum emerges from the heat transfer unit, it is directed by a three-way valve into a second 55 gallon drum, designated Drum No. 2, at Station 2. When the entire contents of the petrolatum have been received in the Drum No. 2, the drum is moved to Station 1, from which Drum No. 1 has been removed, and it is connected to the grease pump. Valves 1 and 2 are then closed and valves 3 and 4 opened and the petrolatum then pumped by the grease pump to a constant feed, uniform pressure pump, such as a Moyno pump, Model No. Food Pump F4, available from Robbins & Mayers, Inc. of Springfield, Ohio. The petrolatum is pumped at a uniform rate into the heat transfer unit, which has been brought to a temperature of approximately 105° F. Just before the petrolatum enters the unit, nitrogen gas at a pressure of 14.7 lbs. per sq. inch is fed into the feed line by means of a conventional sparger tube. At this point of introduction of the nitrogen gas, the petrolatum is in a semi-congealed state. The sparger tube has an inside diameter of 5/64 inch and is provided with four longitudinally extending lines of holes, 2 mils in diameter, disposed equally about the tube, each line having five holes per inch tube length. Just before the nitrogen enters into the sparger tube, it passes through a rotameter for measuring its rate of flow. A suitable rate is 95 cc. of nitrogen per minute with a feed rate of petrolatum into the heat transfer unit of 7 lbs. per minute with the scraping blades in the unit again operating at 600 r.p.m. The petrolatum is heated in the unit to about 105° F. and the nitrogen is uniformly subdivided and dispersed in the petrolatum by the scraping blades. Generally, a single pass through the heat transfer unit will disperse the gas uniformly. Samples of petrolatum with the nitrogen gas dispersed therein are then bled off through the three-way valve and the samples evaluated in the manner described below to determine the amount of nitrogen gas dispersed in the petrolatum. When the desired level has been reached by suitably adjusting the rate of feed of nitrogen, as required, the three-way valve is changed to feed the petrolatum into a line heated by heating tape to about 105° F., which is directed into a filler hopper provided with an insulated air jacket. The petrolatum may then be fed from the hopper into glass jars heated to a temperature in the range of from about 160° F. to about 180° F., and the filled jars capped and cooled by air.

The resulting package and product is essentially devoid of entrapped air bubbles, large voids, and crater-like depressions. It is attractive and the jar does not have the appearance of an incomplete fill. The petrolatum has a glossy, smooth-textured appearance, and improved consistency, and is less oily and greasy to the feel, as compared to the petrolatum prior to incorporating the nitrogen. It is also whiter looking.

The following is a method for sampling the petrolatum to determine the amount of nitrogen being dispersed therein during processing. A calibrated, tared beaker is filled with the petrolatum to be processed, i.e., containing no nitrogen, and the weight of the petrolatum is determined at a fixed temperature, e.g., 105° F. The petrolatum is then completely removed from the beaker and an equal volume of the sampled petrolatum containing the nitrogen dispersed therein is weighed in the same beaker under the same conditions. The weight differential between the petrolatum before processing and the petrolatum containing the nitrogen is then determined. The percentage by weight of petrolatum displaced by the nitrogen is obtained by dividing the weight differential by the weight of petrolatum containing no nitrogen and multiplying by 100. For purposes of convenience, a graph may be prepared beforehand wherein the abscissa represents, in percent, the amount of petrolatum displaced by nitrogen, and the ordinate represents actual weights of the petrolatum containing various amounts of nitrogen. By weighing the sampled petrolatum containing the nitrogen, the amount in percent displaced by the nitrogen may be rapidly obtained by referring to the graph.

The following is an example, also for illustrative purposes, of another embodiment of the invention in which the petrolatum is processed continually.

The same petrolatum described in the above-mentioned batch process is melted by heating to 160° F. in the scraped-surface heat transfer unit, e.g., the "Thermutator," available from Cherry-Burrell, Inc., in which the scraping blades are rotating at 600 r.p.m. At this point, a perfume or other constituents may be added, if desired. The heated petrolatum is then pumped into a second heat transfer unit of the same type and with its scraper blades rotating at 600 r.p.m., wherein it is cooled to 90° F., i.e., just above its congealing temperature of 85° F. It is then pumped into a third heat transfer unit, also of the same type, but just before it enters, nitrogen is injected into the feed line by means of the sparger tube into the petrolatum while it is in a semi-congealed state. The temperature of the petrolatum is raised in the third heat transfer unit, whose scraper blades also rotate at 600 r.p.m., to about 105° F., at which temperature the petrolatum flows readily, to uniformly disperse the nitrogen in the petrolatum. The heated petrolatum with the nitrogen gas so dispersed is fed directly from the third heat transfer unit into the hopper from which it may be fed into glass jars preheated to a temperature of 160° F. to 180° F. The filled jars are then cooled by air.

The improvement in consistency in petrolatums incorporating the invention was measured on a Brookfield Rotational Viscometer, Model HAT, which was provided with a Helipate accessory. The T bar (code designation "E") was driven downwardly into the petrolatums tested, which were heated to a temperature of 70° F., at the device's constant rate of speed, while simultaneously being rotated at 2.5 r.p.m. The reading obtained on the dial multiplied by the factor used with the particular T bar employed, gives the viscosity, in centipoises, which in turn is directly related to consistency.

The viscosity of a U.S.P. grade petrolatum tested, such as that available from Sonneborn Refining and Chemical Corporation under the trade name "Protopet 1-S" was, before processing, about 160 to 164 million centipoises, while the same petrolatum having air uniformly dispersed therein in an amount sufficient to displace about four percent, by weight, of the petrolatum had a viscosity of from 72 to 84 million centipoises. The consistency of the "White Perfecta" petrolatum referred to above was about 308 to 310 million centipoises before processing and the viscosity of the same petrolatum having nitrogen gas uniformly dispersed therein in an amount to displace about 3% by weight, of the petrolatum had a viscosity of about 140 to 148 million centipoises.

The foregoing results establish that by uniformly dispersing small quantities of a gas throughout the petrolatum, there is obtained a reduction in viscosity of about one half and hence an improvement in consistency.

Although in the above-described embodiments of the invention, displacing at least about one-half percent by weight of the petrolatum with the uniformly dispersed gas has been found to overcome the filling problems, it is preferred that sufficient gas be dispersed to displace from about 3% to about 9% by weight of the petrolatum. It has been determined that by incorporating such quantities of gas, there is obtained a petrolatum which has improved appearance, gloss and consistency. More than 9% gas may be incorporated, if desired. However, so doing imparts to the petrolatum a creamy whipped-like appearance, rather than the customary appearance of petrolatum. This form may, however, be desired for certain applications.

When the nitrogen gas, or other gas used, is injected into the line feeding the petrolatum into the heat transfer unit, it is important that the petrolatum be in a semi-congealed state, and not melted. If the petrolatum is melted, it is difficult to entrap and disperse the nitrogen in the petrolatum; the temperature at which petrolatum melts causes the gas to be driven off. Suitable results are obtained by heating the petrolatum to a temperature slightly above its congealing point, and preferably to about 10° to 15° above its congealing point.

It is also important that the petrolatum be maintained below its melting temperature after the nitrogen has been dispersed therein and during filling to avoid driving off the entrapped nitrogen. In addition, if the petrolatum is in a melted form when placed into the jars, it shrinks appreciably out of contact with the wall surfaces of the jars, particularly at the bottom.

It is desirable that the jars or containers to be filled with the petrolatum be at a temperature slightly above the temperature of melting of the petrolatum, e.g., 160° F. to 180° F. in the case of the above-described embodiment, so that the petrolatum will flow freely down the walls of the container into intimate contact to avoid the entrapment of air. The temperature to which the jars are heated is established by the melting point of the particular petrolatum being processed.

Essentially any gas which is compatible with petrolatum, which does not exercise undesirable deleterious effects, and which is compatible with the contemplated end uses for the petrolatum may be used in the practice of the invention. For example, inert gases such as argon, neon, helium and krypton may be used, but nitrogen is preferred for economic reasons. Air may also be used but is not preferred because it may be incompatible with stabilizers customarily incorporated in petrolatum. Similarly, any petrolatum can be employed in the practice of the invention, while simultaneously upgrading its color and physical characteristics.

It is apparent that variations and changes may be made in the above-described illustrative embodiments of the invention, while still remaining within its scope.

What is claimed is:

Petrolatum having a density of at least about 0.88 at 77° F. and a melting point of at least about 140° F., and containing uniformly dispersed nitrogen gas in an amount sufficient to displace from about 3% to about 9%, by weight, of said petrolatum.

References Cited

UNITED STATES PATENTS

| | | | |
|---|---|---|---|
| 1,494,544 | 5/1924 | Heath | 167—91 |
| 1,995,371 | 3/1935 | Werder | 252—15 |
| 2,110,503 | 3/1938 | Duckham | 252—15 |
| 3,121,686 | 2/1964 | Sherer | 262—15 |

DANIEL E. WYMAN, *Primary Examiner.*

P. E. KONOPKA, *Assistant Examiner.*